(12) United States Patent
Kutilek et al.

(10) Patent No.: US 10,534,859 B2
(45) Date of Patent: Jan. 14, 2020

(54) METHOD OF COMPUTERIZED PRESENTATION OF A LEGEND OF OBJECT SYMBOLS ON A DOCUMENT

(71) Applicant: Bluebeam, Inc., Pasadena, CA (US)

(72) Inventors: Jack Kutilek, Woodside, NY (US); Elliot Chenault, Monrovia, CA (US)

(73) Assignee: Bluebeam, Inc., Pasadena, CA (US)

( * ) Notice: Subject to any disclaimer, the term of this patent is extended or adjusted under 35 U.S.C. 154(b) by 0 days.

(21) Appl. No.: 15/333,823

(22) Filed: Oct. 25, 2016

(65) Prior Publication Data
US 2017/0116167 A1    Apr. 27, 2017

Related U.S. Application Data

(60) Provisional application No. 62/297,754, filed on Feb. 19, 2016, provisional application No. 62/246,499, filed on Oct. 26, 2015.

(51) Int. Cl.
*G06F 17/00* (2019.01)
*G06F 17/24* (2006.01)
*G06T 11/60* (2006.01)

(52) U.S. Cl.
CPC ............ *G06F 17/241* (2013.01); *G06T 11/60* (2013.01)

(58) Field of Classification Search
CPC .................................................. G06F 17/241
See application file for complete search history.

(56) References Cited

U.S. PATENT DOCUMENTS 6,134,338 A    10/2000  Solberg et al.
6,988,241 B1 *  1/2006  Guttman ............... G06F 17/246
                                           707/E17.115

(Continued)

FOREIGN PATENT DOCUMENTS

WO    2011/150415 A2    12/2011

OTHER PUBLICATIONS

Gobel et al., "Improving Map Reading with Gaze-Adaptive Legends," ETRA '18, Poland, copyright 2018 ACM, 9 pages. (Year: 2018 ).*

(Continued)

*Primary Examiner* — Amelia L Tapp
(74) *Attorney, Agent, or Firm* — Bookoff McAndrews, PLLC

(57) ABSTRACT

A method of computerized presentation of a legend of object symbols on a document. The method includes receiving a document having object symbols. Each object symbol includes a graphical representation, an object symbol type and an object type numerical value. The method includes generating one or more groups of object symbols of the one or more object symbols based upon the object symbol type of each of the object symbols. The method includes deriving a group cumulative quantity for each group of object symbols based upon the object type numerical value of each object symbol in each group of object symbols. The method includes generating a legend including a one or more legend entries corresponding to each of the one or more groups of object symbols. Each legend entry includes a group type symbol, the object symbol type, and a group cumulative quantity. The method includes displaying the legend.

11 Claims, 12 Drawing Sheets

(56) References Cited

U.S. PATENT DOCUMENTS

| | | | | |
|---|---|---|---|---|
| 7,013,433 | B1* | 3/2006 | Schorr | G06F 17/241 |
| | | | | 345/440 |
| 8,271,892 | B2* | 9/2012 | Duncker | G06F 17/30893 |
| | | | | 345/440 |
| 8,438,489 | B2* | 5/2013 | Barthelmess | G06F 17/242 |
| | | | | 345/179 |
| 8,977,558 | B2* | 3/2015 | Nielsen | G06Q 10/103 |
| | | | | 705/7.42 |
| 9,223,769 | B2* | 12/2015 | Tsibulevskiy | G06F 17/30014 |
| 2002/0009223 | A1 | 1/2002 | Wong | |
| 2004/0015367 | A1 | 1/2004 | Nicastro et al. | |
| 2004/0061701 | A1 | 4/2004 | Arquie et al. | |
| 2004/0164983 | A1* | 8/2004 | Khozai | G06T 11/206 |
| | | | | 345/440 |
| 2007/0244783 | A1* | 10/2007 | Wright | G06Q 40/00 |
| | | | | 705/35 |
| 2010/0077316 | A1* | 3/2010 | Omansky | G06Q 10/10 |
| | | | | 715/751 |
| 2016/0103593 | A1* | 4/2016 | Wynne, IV | G06F 3/04845 |
| | | | | 715/771 |

OTHER PUBLICATIONS

Thomas, Shane, PCT Notification of Transmittal of the International Search Report and the Written Opinion of the International Searching Authority, or the Declaration, dated Jan. 17, 2017, pp. 1-8, Alexandria, Virginia.

\* cited by examiner

METHOD OF COMPUTERIZED PRESENTATION OF A LEGEND OF OBJECT SYMBOLS ON A DOCUMENT

CROSS-REFERENCE TO RELATED APPLICATIONS

This non-provisional patent application and claims priority to and the benefits of U.S. Provisional Patent Application Ser. No. 62/246,499, entitled AUTOMATIC ANNOTATION-BASED LEGEND GENERATION, filed on Oct. 26, 2015, and U.S. Provisional Patent Application Ser. No. 62/297,754, entitled AUTOMATIC ANNOTATION-BASED LEGEND GENERATION, filed on Feb. 19, 2016, the entire contents of which are both herein incorporated by reference.

STATEMENT RE: FEDERALLY SPONSORED RESEARCH/DEVELOPMENT

Not Applicable

BACKGROUND

1. Technical Field

The present disclosure relates generally to computerized document analysis. More particularly, the present disclosure relates to a method of computerized presentation of a legend of object symbols on a document.

2. Related Art

The core of modern business is information, with its creation, distribution, and management being primary functions. Information or content can be presented in a variety of different ways, including word processing documents, spreadsheets, graphics, photographs, engineering drawings, architectural plans, and so forth. In electronic form, these are all generally referred to as documents, and may be generated by software applications that are specific thereto. A typical workflow in the enterprise involves various personnel collaborating to create, review, and/or edit such documents, and because of advancements in high-speed data communications and computing capabilities, these processes can involve remote personnel.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

From the user interface perspective, PDF documents are typically rendered as a static, graphical image, in which individual elements thereof such as text, pictures, and other elements are not editable. However, one of several improvements that have been made since the initial releases of PDF readers, writers, and the standard itself, is the support for adding annotations to a base document. Such annotations are graphically overlaid or "placed" on the underlying document, with placement being precisely controlled by the user. Thus, the functionality is similar to graphic illustration/design and image manipulation applications where various objects can be positioned on a document canvas by navigating a cursor to a desired location and providing a subsequent input to make placement permanent. Before positioning the cursor, the object to be placed, such as a geometric primitive, a text box, or the like, is selected.

One of the significant advantages of working with electronic documents such as those in the PDF format is the ability to store and efficiently search information embedded therein. With non-electronic or paper documents, even with the best of cataloging and other indexing tools, searching and accounting for items of information proved to be an arduous and painstaking process.

In the construction industry, a punch list is a summary prepared near the end of a project listing work not conforming to contract specifications that a contractor must complete. The work may include incomplete or incorrect installations, incidental damage to existing finishes, material, and structures, and the like. The information of such punch lists would be in relation to specific locations at a work site, which can be correlated to locations on architectural or construction drawings. In this regard architectural drawings may be annotated with such information.

Material take off (MTO) is a term used in engineering and construction, and refers to a list of materials with quantities, characteristics and/or types that are required to build a designed structure or item. A list of required materials for construction is sometimes referred to as the material take off list (MTOL). This list is generated by analyzing architectural, blueprint, construction or other design documents and determining the materials and their characteristics that are required to accomplish the design. As such, the design documents are annotated with information at various locations about a work location that is used to generate a material take off list. For example, a kitchen location may be annotated with information regarding floor tiles to be used (and may include information regarding area, linear measurements, tile type, tile weight, etc.). The material takeoff may be used to create a bill of materials. Material take off is not limited to the quantity or amount of required material, but also the weight of the items taken off. This is important when dealing with larger structures, allowing the company that does the take off to determine total weight of the item and how best to move the item (if necessary) during construction.

There is a need in the art for an improved method for analyzing documents with regard to various items and objects located within the documents in comparison to the prior art.

BRIEF SUMMARY

In accordance with one embodiment of the present disclosure, a method of computerized presentation of a legend of object symbols on a document is provided. The method includes receiving a document having one or more object symbols. Each object symbol includes a graphical representation, an object symbol type and an object type numerical value associated therewith. The method further includes generating one or more groups of object symbols of the one or more object symbols based upon the object symbol type of each of the object symbols. The method further includes deriving a group cumulative quantity for each group of object symbols based upon the object type numerical value of each object symbol in each group of object symbols. The method further includes generating a legend including a one or more legend entries corresponding to each of the one or more groups of object symbols. Each legend entry includes a group type symbol, the object symbol type corresponding to the group of object symbols, and a group cumulative quantity. The method further includes displaying the legend on the document. In this regard, an aspect of the present invention allows for the creation of a legend or table that is automatically formatted with a graphical representation of a user's selected object symbols along with a description and cumulative numerical quantity of such object symbols according to selected groups.

According to various embodiments, the object type numerical value for a given object symbol may be 1. The object type numerical value for a given object symbol may correspond to a measurement, such as a linear distance or an area. A selected one of the one or more object symbols may have more than one object type numerical value associated therewith. Each legend entry may include a unit of measurement corresponding to the group cumulative quantity. Each legend entry may include a type description corresponding to the object symbol type. Each group type symbol may include a graphical representation. The method may further include receiving a selection of object symbols of the one or more object symbols. The generating of the one or more groups of object symbols is based upon the selected object symbols. The method may further include receiving changes to the document, and the changes include changes to a number of the object symbols. The method may further include revising the group cumulative quantity for each group of object symbols which have been changed, regenerating the legend, and redisplaying the legend on the document. The document may include multiple pages, and the method may further include receiving a page range of the multiple pages. The generated one or more groups of object symbols is within the received page range.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

A method of computerized presentation of a legend of object symbols on a document. The method includes receiving a document having object symbols is disclosed in accordance with various embodiments of the present invention. Additional details of this method will be discussed more fully below. It is understood that this method may be implemented as one or more computer-executable instructions that can be stored on a data storage medium.

Figure 1:
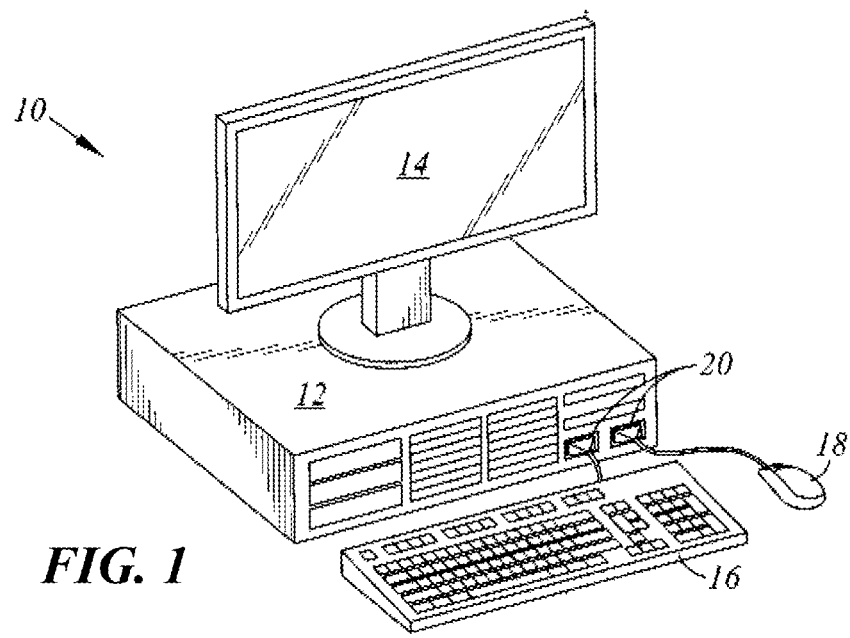
FIG. 1 is an exemplary computer system that may be capable to perform functions for use with aspects of the present invention including a display monitor, a system unit, and input/output devices.

FIG. 1 depicts an exemplary hardware environment in which various aspects of the contemplated method of computerized presentation of a legend of object symbols on a document. The method includes an initial step of receiving a document having object symbols. Generally, there is a computer system 10 with a system unit 12 and a display monitor 14. The display monitor 14 graphically displays output from the data processing operations performed by the system unit 12. The display monitor 14 is a visual output device and includes some form of a screen. The display monitor 14 may be of a Liquid Crystal Display (LCD) type, a Cathode Ray Tube (CRT) type, or any other suitable type of display. Input devices such as a keyboard 16 and a mouse 18 are manipulable by a user to generate corresponding inputs to the data processing operations, and are connected to the system unit 12 via USB ports 20. Various other input and output devices may be connected to the system unit 12, and alternative interconnection modalities may be substituted with the USB ports 20.

Figure 2:
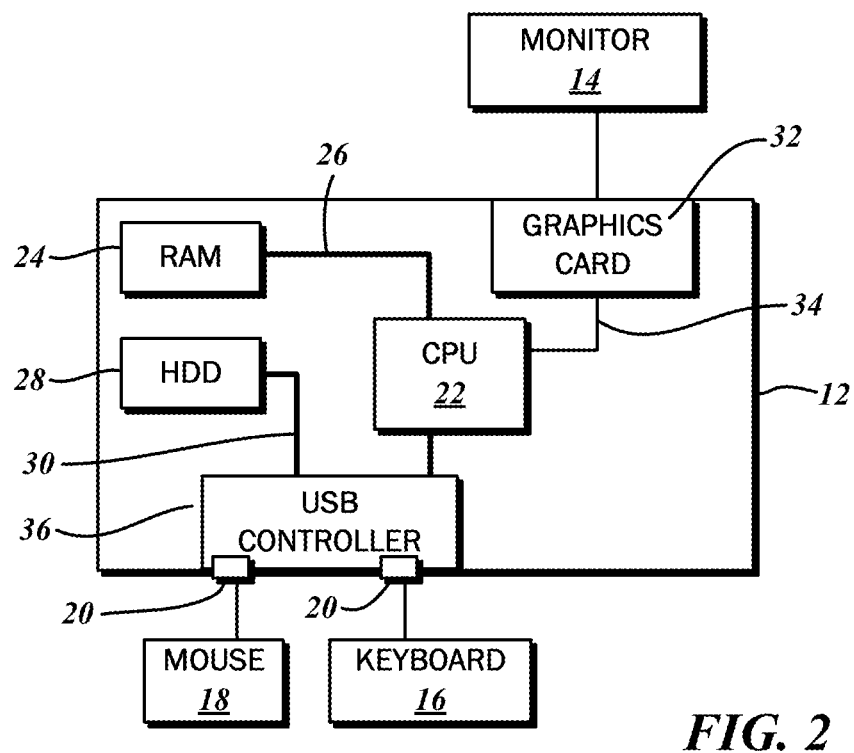
FIG. 2 is a block diagram showing the various components of the system unit in the exemplary client workstation of FIG. 1.

As shown in the block diagram of FIG. 2, the system unit 12 includes a Central Processing Unit (CPU) 22, which may represent one or more conventional types of such processors. A Random Access Memory (RAM) 24 temporarily stores results of the data processing operations performed by the CPU 22, and is interconnected thereto typically via a dedicated memory channel 26. The system unit 12 may also include permanent storage devices such as a hard drive 28, which are also in communication with the CPU 22 over an input/output (I/O) bus 30. Other types of storage devices such as tape drives, Compact Disc drives, and the like may also be connected. A graphics device 32 is also connected to the CPU 22 via a video bus 34, and transmits signals representative of display data to the display monitor 14. As indicated above, the keyboard 16 and the mouse 18 are connected to the system unit 12 over the USB port 20. A USB controller 36 translates data and instructions to and from the CPU 22 for external peripherals connected to the USB port 20 or wirelessly connected via Bluetooth connectivity. Additional devices such as printers, microphones, webcams, speakers, and the like may be connected to the system unit 12.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display monitor 14. Generally, the operating system and the computer programs are tangibly embodied in a computer-readable medium, e.g. one or more of the fixed and/or removable data storage devices including the hard disk drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with system unit 12, specifically with the graphics being displayed on the display monitor 14, via the mouse 18. The movement of a cursor generated on the display monitor 14 is tied to the movement of the mouse 18, with further interactivity being provided with input from the mouse buttons. Input from the keyboard 16 also provides interactivity with the system unit 12. It is understood that a user would interact with the system unit 12 though of the mouse 18, keyboard 16, and/or any other input modalities such as pen/digitizers, touch screens and the like.

The foregoing computer system 10 represents only one exemplary apparatus suitable for implementing aspects of the present invention. As such, the computer system 10 may have many different configurations and architectures. Any such configuration or architecture may be readily substituted. Moreover, the method may be implemented via a distributed system such as through the use of a computer server system with interactions between a remote server application and a client workstation.

Figure 3:
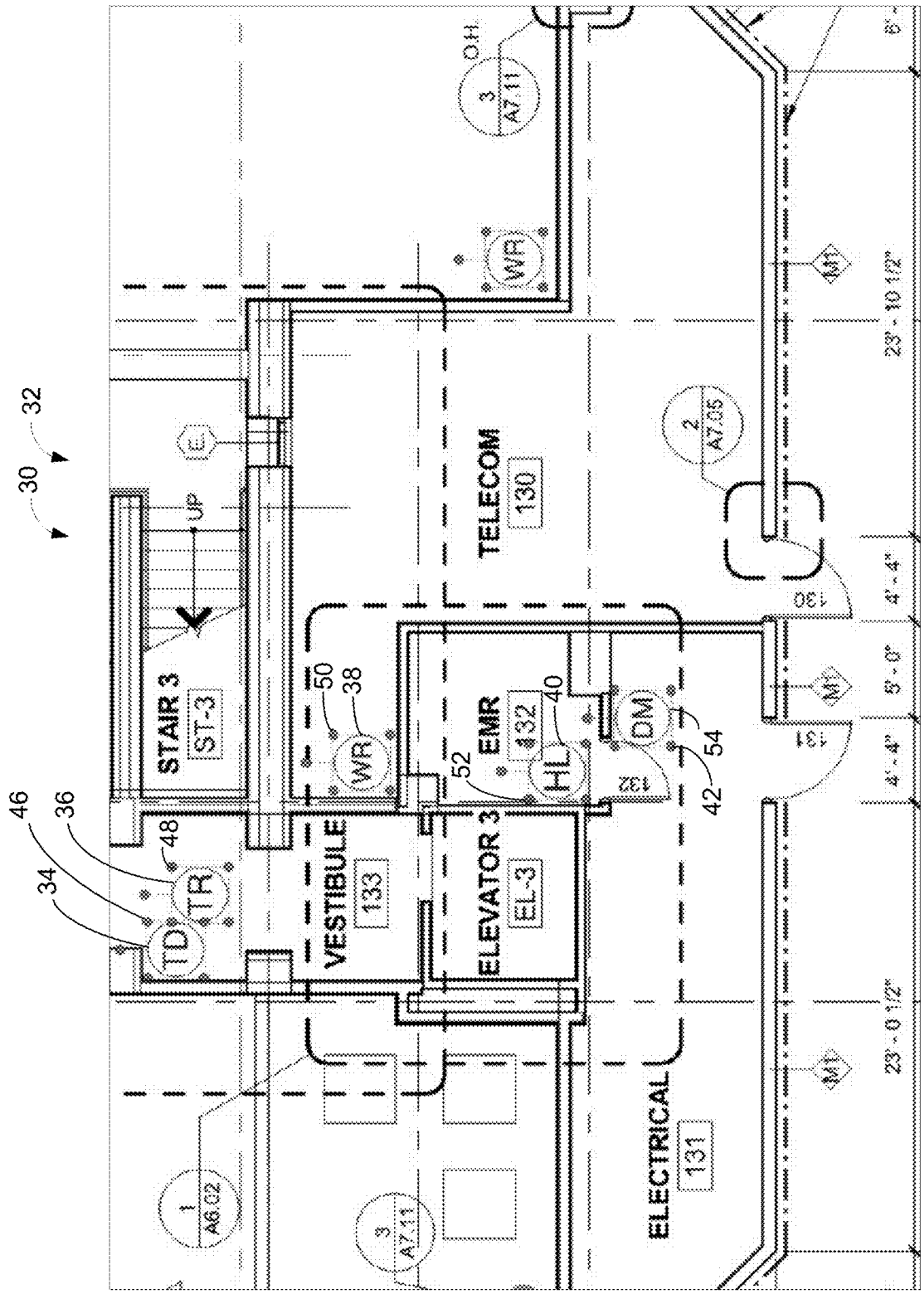
FIG. 3 is an exemplary graphical user interface of a software application for displaying a document with various object symbols selected.

FIG. 3 illustrates one exemplary graphical user interface 30 displaying a document 32 of a software application of computerized presentation of a legend of object symbols on a document. As utilized herein, the term document refers to an electronic file or standalone representation of data that can be opened, rendered and/or edited by the corresponding document editing software application. Accordingly, the document may be formatted and structured in a particular way so that its elements can be rendered consistently. In the exemplary embodiment discussed herein, a document reviewing software application handles Portable Document Format (PDF) documents, and the following description of computerized presentation of a legend of object symbols will be in relation thereto. In one exemplary embodiment, the PDF document includes text and graphics. However, as utilized herein, the document is intended to encompass any other types of information that can be displayed on the monitor 20, such as word processing documents, spreadsheets, photographs, graphics layouts, three-dimensional models, video, graphical content such as medical X-ray images, and so forth. However, it will be appreciated by those having ordinary skill in the art that documents in any other formats that are editable with any other software application may be substituted. The software application runs on a windowing system, and accordingly has a number of interface elements that are common to applications for the same. The system unit 12 is understood to have a copy of the software application installed thereon. Those having skill in the art will recognize that the software application is understood to refer to any software program embodying the contemplated method of the present disclosure.

In further detail, the functional, interactive features of the graphical user interface 30 displaying the document 32 are contained within window (not shown) with basic window controls that variously minimize, maximize, and close the window. In addition, the window is contemplated to include a menu bar from which various functions of the reviewing software application may be invoked via activated pull-down menus. So that commonly utilized functions such as opening files, saving changes to the currently opened file, and so forth are readily accessible, there is also a tool bar. It is contemplated that annotations or markups of various types can be placed and manipulated via the graphical user interface. Selection of the markup type may be made with the respective icons of the tool bar.

Markups or annotations are understood to be a type of data object that is associated with an underlying document, and generally refers to a conceptual entity corresponding to a contiguous block of memory at a specific location and with a specific size, and is defined by one or more properties that define its characteristics. A markup can be represented by an object symbol. A markup can be a geometric primitive such as a point, a line (single segment or multi-segment), an ellipse, a polygon, or the like, as well as specialized annotation object such as callout boxes. To further define the features of the annotation, various parameter attributes can be associated therewith such as dimensions, color, line thickness, positioning coordinates, and others that are specific to that markup type. Although markups are stored in the document, they generally do not become a part of an underlying drawing; visually, the markups are overlaid on a separate layer of the document. The markups may be allowed to be viewed when overlaid. Typically this may be toggled on or off as desired.

As object symbols, the visual representation of markups may be used to symbolically represent any data. As will be discussed in detail below, a legend or key may be added as another type of annotation to a document. The legend may be used to describe in text the meaning of an object symbol used in a document. When visually overlaid on a drawing, such as an architectural drawing, the legend may readily aid the viewer of the document to understanding the various object symbols that are presented.

Figure 4:
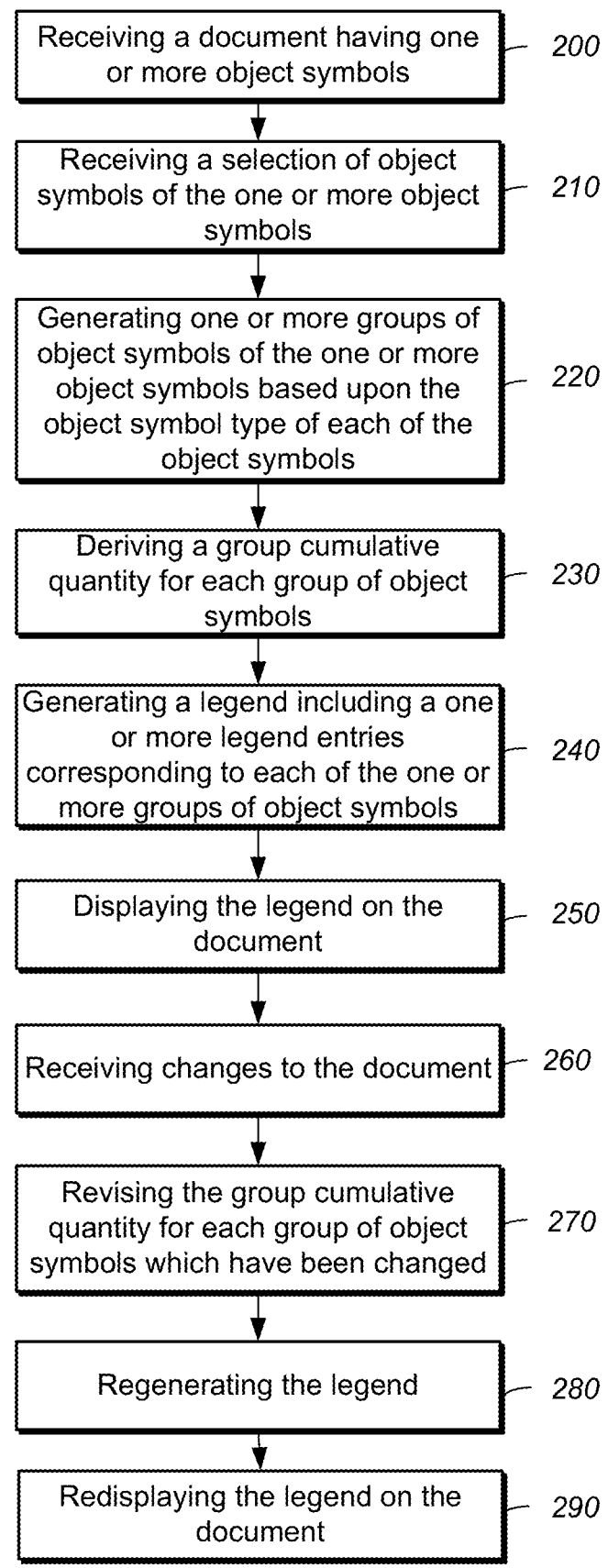
FIG. 4 is a flowchart illustrating a method of computerized presentation of a legend of object symbols on a document is disclosed in accordance with one embodiment of the present disclosure.

With reference to the flowchart of FIG. 4, in accordance with one embodiment of the present disclosure, a method of computerized presentation of a legend of object symbols on a document is provided. The method begins with a step 200 of receiving a document having one or more object symbols. Each object symbol includes a graphical representation, an object symbol type and an object type numerical value associated therewith. The method may further include a step 210 of receiving a selection of object symbols of the one or more object symbols. The method further includes a step 220 of generating one or more groups of object symbols of the one or more object symbols based upon the object symbol type of each of the object symbols. The method further includes a step 230 of deriving a group cumulative quantity for each group of object symbols based upon the object type numerical value of each object symbol in each group of object symbols. The method further includes a step 240 of generating a legend including a one or more legend entries corresponding to each of the one or more groups of object symbols. Each legend entry includes a group type symbol, the object symbol type corresponding to the group of object symbols, and a group cumulative quantity. The method further includes a step 250 of displaying the legend on the document. The method may further include a step 260 of receiving changes to the document, and the changes include changes to a number of the object symbols. The method may further include a step 270 of revising the group cumulative quantity for each group of object symbols which have been changed. The method may further include a step 280 of regenerating the legend. The method may further include a step 290 of redisplaying the legend on the document.

With further reference to FIG. 3, the document 32 is represented by a zoomed in portion of an example architectural or engineering drawing. Further, the document 32 may encompass multiple pages as well. It is understood that the document 32 extends beyond that which is shown in the particular view of the graphical user interface 30. In the portion of the document 30, there are provided various markups that are represented by object symbols 34, 36, 38, 40, 42 and 44. In this example, the object symbols 34, 36, 38, 40, 42 and 44 are graphically represented by two letters of text within a circle. However, it is understood that any other graphical representations of the object symbols may be used. Each of the object symbols 34, 36, 38, 40, 42 and 44 includes a graphical representation, an object symbol type and an object type numerical value associated therewith.

As mentioned above each of the object symbols 34, 36, 38, 40, 42 and 44 has a corresponding object symbol type and an object type numerical value associated therewith. For example, the object symbols in this document 32 may correspond to markups for a punchlist. Object symbol 42 that is graphically represented by the letters "DM" inside of a circle may correspond to an object symbol type for "damaged moulding." The object type numerical value for this object symbol 42 may be 1. This would be understood to indicate that there is moulding work that has been damaged at the location indicated by the object symbol 42 on the document 32.

Each of the object symbols 34, 36, 38, 40, 42 and 44 have been selected as respectively indicated by selection highlights 46, 48, 50, 52, 54 and 56. It is understood that a user may make such selection through interaction with the graphical user interface 30 such as through the use of a cursor/mouse and/or keyboard controls. In this regard, the step 210 of receiving a selection of object symbols of the one or more object symbols is processed by the system unit 12. The user need not select all of the various object symbols contained in the document 32 but may be selective in such selections. Further, while only the object symbols 34, 36, 38, 40, 42 and 44 are displayed, additional object symbols may also be selected that are not displayed in this zoomed in view.

Figure 5:
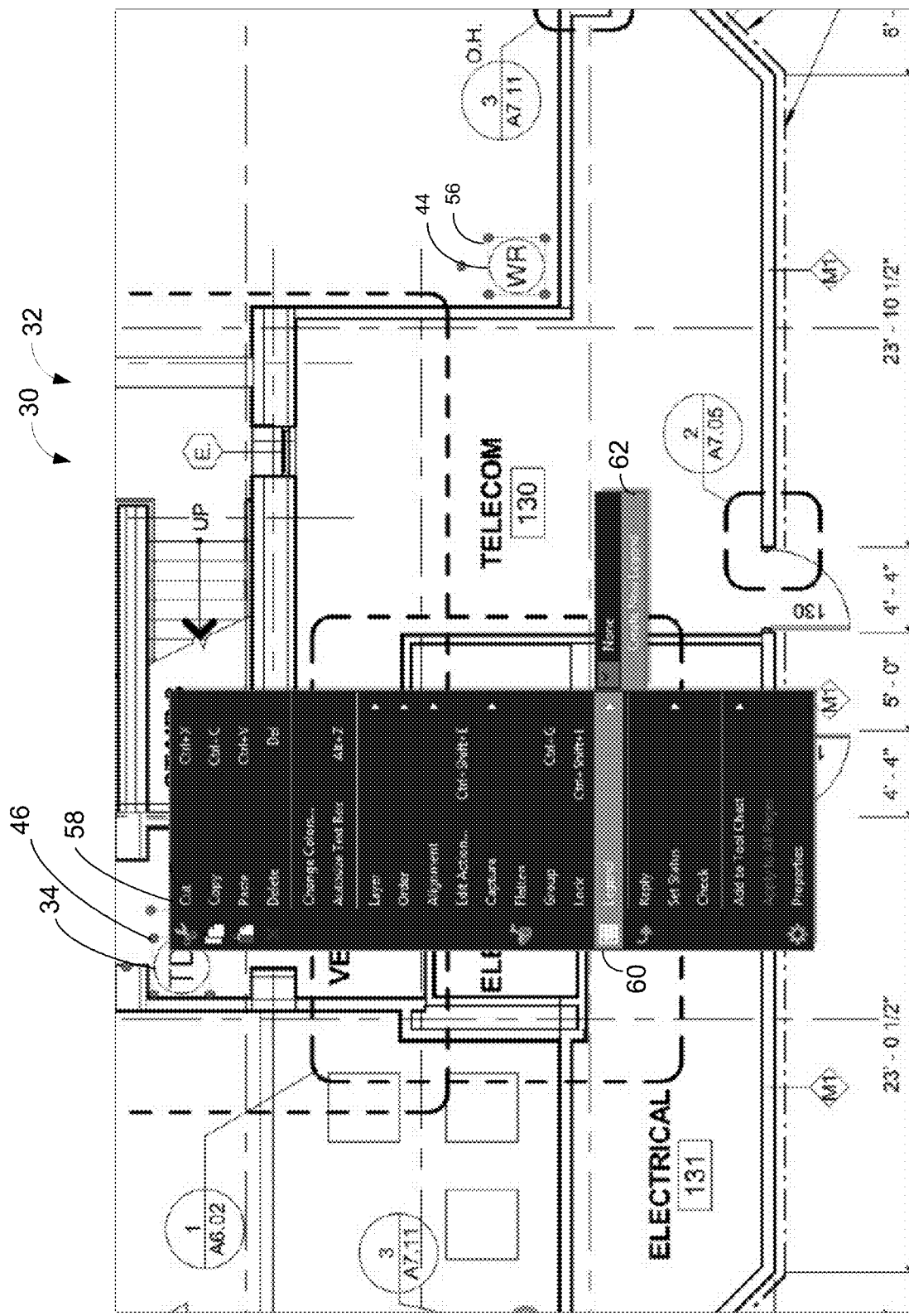
FIG. 5 is the exemplary graphical user interface of FIG. 3 with the addition of a tools menu.

Referring now to FIG. 5, there is depicted the graphical user interface 30 of FIG. 3 with the addition of a tools menu 58. The tools menu 58 may be accessed and displayed by "right-clicking" of the mouse controls. Movement of a cursor adjacent a legend tool menu item 60 allows for the selection of a "Create New Legend" sub-menu item 62. The selection of the "Create New Legend" sub-menu item 62 is contemplated to initiate the step 220 of generating one or more groups of object symbols of the one or more object symbols based upon the object symbol type of each of the object symbols. The generation of the one or more groups of object symbols may be based upon the selected object symbols. It is contemplated that the document may include multiple pages. In this regard, the method may further include receiving a page range of the multiple pages. The generated one or more groups of object symbols is within the received page range.

As mentioned above, the method further includes a step 230 of deriving a group cumulative quantity for each group of object symbols based upon the object type numerical value of each object symbol in each group of object symbols. The object type numerical value for a given object symbol may be any value. The object type numerical value may be a singular instance. As such, the object type numerical value may be used for a counter of such instances when grouped or associated with other selected object symbols. For example as in the case of a punch list, an object symbol may correspond to a specific type of work task to be addressed. The object type numerical value for a given object symbol may correspond to a measurement, such as a linear distance, an area, a height, a volume, a weight, and/or results of calculations based upon other measurements (such as an area derived from height and width measurements). A selected one of the one or more object symbols may have more than one object type numerical value associated therewith.

Figure 6:
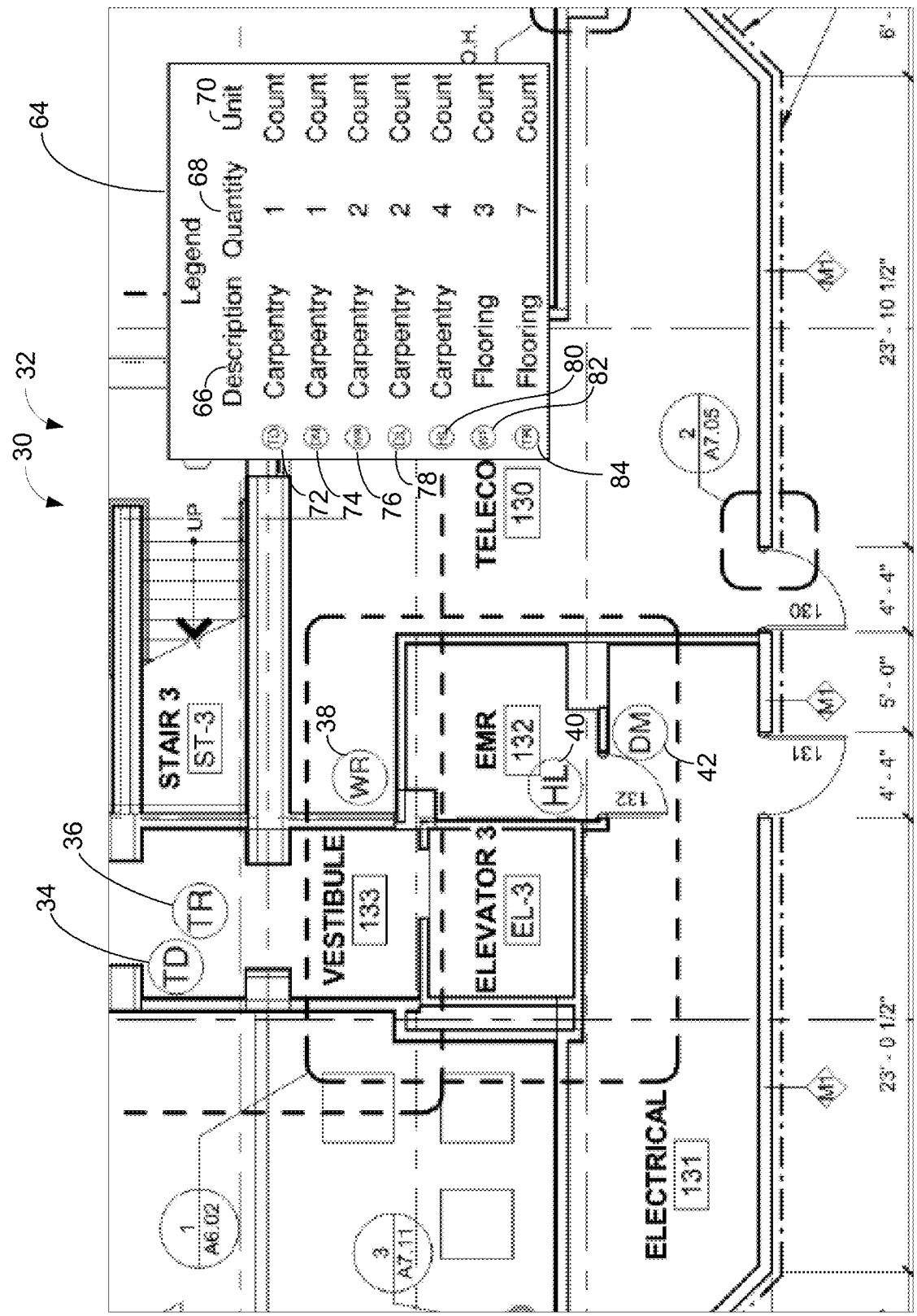
FIG. 6 is the exemplary graphical user interface of FIG. 5 with the addition of a legend.

Referring now to FIG. 6, there is depicted the graphical user interface 30 of FIG. 5 with the additional of a legend 64. In this example, the method of the present invention is contemplated to be used to generate a punchlist. The legend 64 features a legend entry type header 66 denoted "Description," a legend entry type header 68 denoted "Quantity," and a legend entry type header 70 denoted "Unit." The legend 64 includes legend entries 72, 74, 76, 78, 80, 82 and 84. Each legend entry 72, 74, 76, 78, 80, 82 and 84 includes a corresponding group type symbol, the object symbol type corresponding to the group of object symbols, and a group cumulative quantity.

In this example, legend entry 74 corresponds to a group type symbol with a graphical representation of the text "DM" within a circle. This corresponds to the group of object symbols based upon the object symbol type of the object symbol 42 (that was previously selected as discussed above). Each legend entry may include a type description corresponding to the object symbol type. The type description for the legend entry 74 may be for "Damaged Molding" for example. It is contemplated that the legend entries may have more than one type description. For example, each of the legend entries 72, 74, 76, 78, 80, 82 and 84 has a trade description. For example the legend entry 74 has a trade description of "Carpentry" as presented in tabular form under the legend entry type header 66 denoted "Description." The legend entry 74 includes the group cumulative quantity of "1" as presented in tabular form under the legend entry type header 68 denoted "Quantity." Each legend entry may include a unit of measurement corresponding to the group cumulative quantity. The legend entries 72, 74, 76, 78, 80, 82 and 84 include the unit of measurement of the group cumulative quantity of "Count" as presented in tabular form under the legend entry type header 70 denoted "Unit." The legend entry 76 has a group cumulative quantity of "2". This legend entry 76 corresponds to the previously selected object symbols 38 and 44. In this regard, an aspect of the present invention allows for the creation of a legend or table that is automatically formatted with a graphical representation of a user's selected markup or object symbols along with a description and cumulative numerical quantity of such object symbols.

It is contemplated that the particular position of the legend 64 may be readily modified by the user. In this regard, the window of the legend 64 may be clicked on and dragged to another location about the document 32 or otherwise moved according to the user controls of the graphical user interface 30. It is further contemplated that the visual presentation of the legend may also be readily modified by the user according to the user controls of the graphical user interface 30. For example the overall sizing of the legend 64, font, font size, font color, background color/shading, column spacing, columns of data presented, and so forth may be modified.

Figure 7:
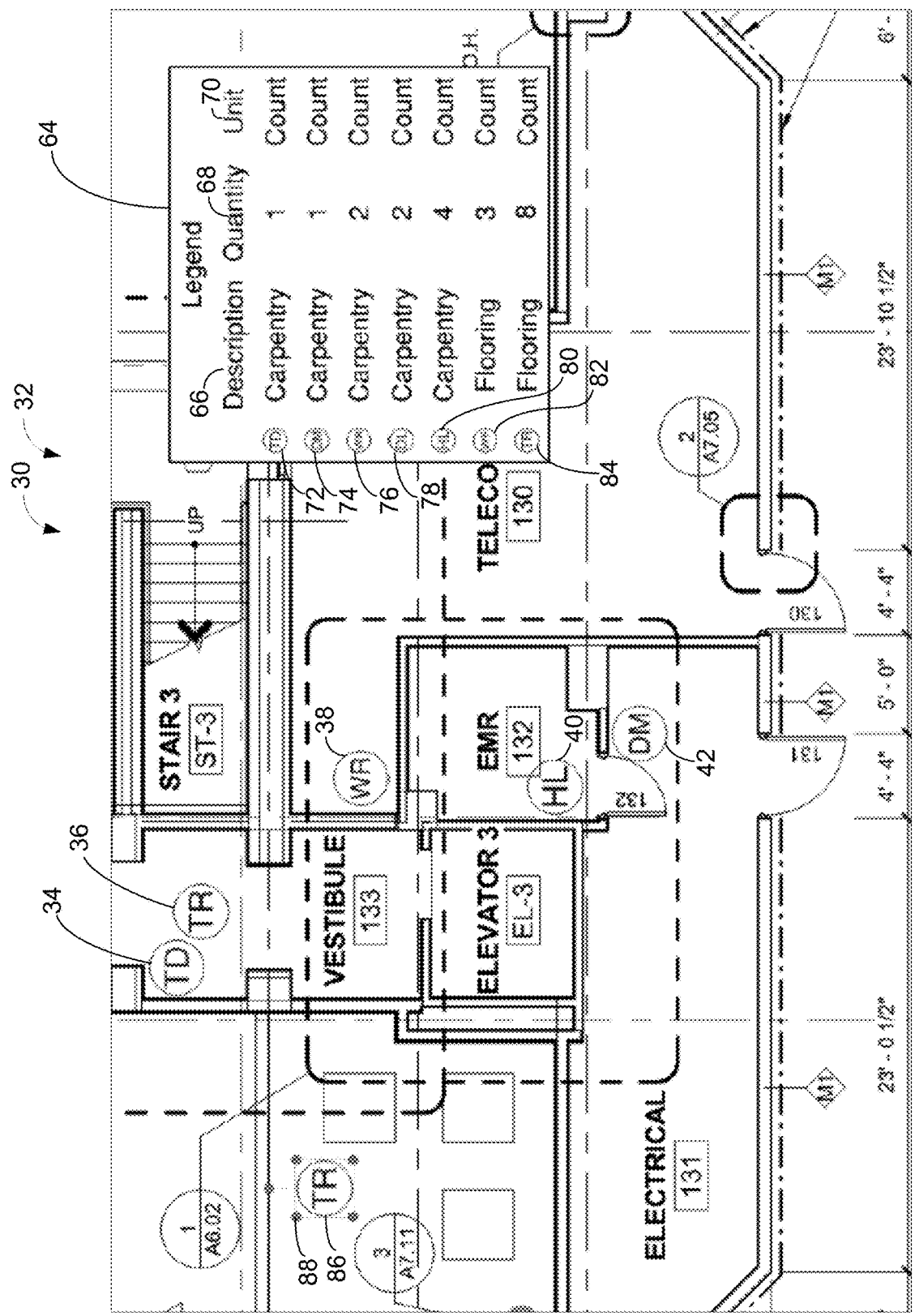
FIG. 7 is the exemplary graphical user interface of FIG. 6 with the addition of a new object symbol.

Referring now to FIG. 7, there is depicted the graphical user interface 30 of FIG. 6 with a new markup having been added, object symbol 86. The object symbol 86 is graphically represented by the letter "TR" within a circle. Object symbol 86 has been selected as indicated by selection highlight 88. As mentioned above, the method may further include the step 260 of receiving changes to the document 30, and the changes include changes to a number of the object symbols, such as the addition of the object symbol 86. As the object symbol 86 has been selected, the method may further include a step 270 of revising the group cumulative quantity for each group of object symbols which have been changed. In this case, the legend entry 84 corresponds to the object symbol type of the newly added object symbol 86. The method may further include the step 280 of regenerating the legend 64 and the step 290 of redisplaying the legend 64 on the document 32. As the object type numerical value of the newly added object symbol 86 is a single instance, the group cumulative quantity is increased by 1 and is recalculated to be 8 from 7 as shown. In this regard, the quantity value of the legend 64 may be dynamically updated from the perspective of the viewing user.

Figure 8:
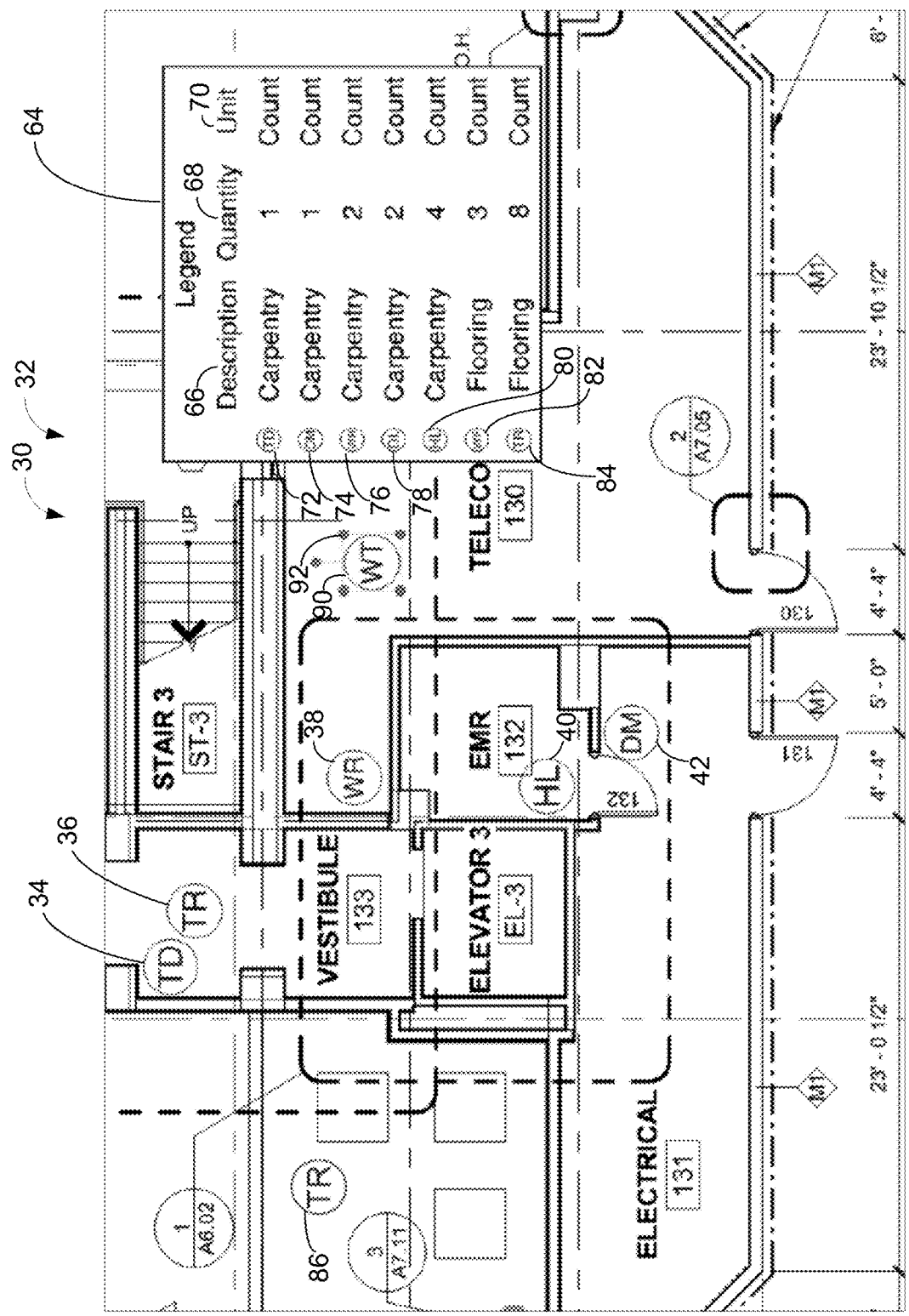
FIG. 8 is the exemplary graphical user interface of FIG. 7 with the addition of a new object symbol.

Referring now to FIG. 8, there is depicted the graphical user interface 30 of FIG. 7 with a new markup having been added, object symbol 90. The object symbol 90 is graphically represented by the letter "WT" within a circle. The object symbol 90 has been selected as indicated by selection highlight 92. However, object symbol type of the newly added object symbol 90 is not already associated with the legend 64. As such, in this embodiment, the legend 64 does not change. In other embodiments, it is contemplated that the system may be configured to automatically select any newly added object symbols for addition to the legend 64.

Figure 9:
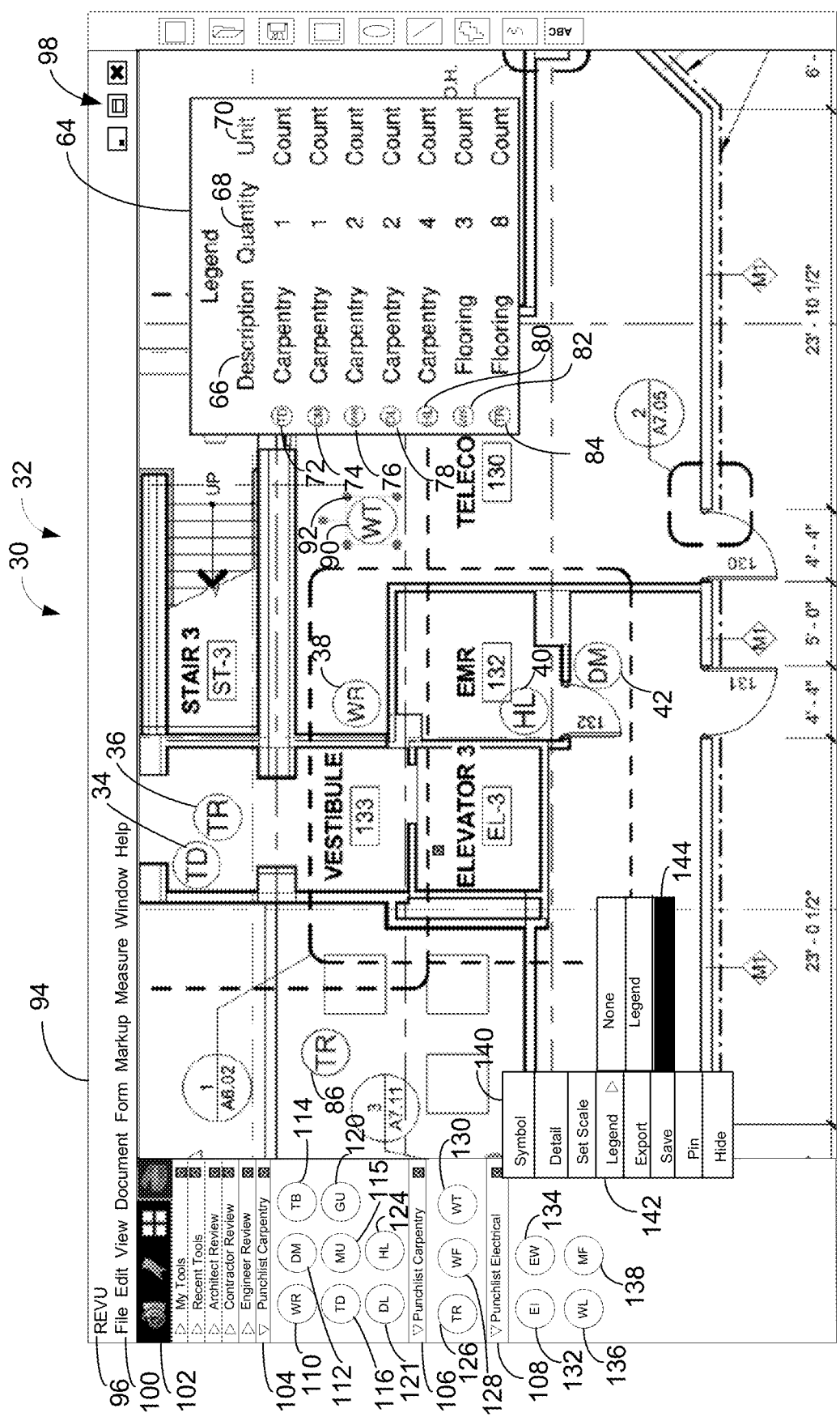
FIG. 9 is the exemplary graphical user interface of FIG. 8 with the addition of a main window of the graphical user interface.

Referring now to FIG. 9 there is depicted the graphical user interface 30 and document 32 of FIG. 8. In addition, there is depicted a main window 94 that is included in the graphical user interface 30. In further detail, the functional, interactive features of the graphical user interface 32 are contained within a main window 94 that includes a title bar 96 with basic window controls 98 that variously minimize, maximize, and close the main window 94. In addition, the main window 94 includes a menu bar 100, from which various functions of the software application may be invoked via activated pull-down menus. So that commonly utilized functions such as opening files, saving changes to the currently opened file, and so forth are readily accessible, there is also a tool bar 102. It is contemplated that annotations of various types can be placed and manipulated via the graphical user interface 30. Selection of the object symbols and related groups of object symbol types may be made with the respective icons of the tool bar 102.

Tools sets 104, 106 and 108 may be provided. The tool set 104 is denoted "Punchlist Carpentry," the tool set 106 is denoted "Punchlist Flooring" and the tool set 108 is denoted "Punchlist Electrical." The tool set 104 includes object symbol tools 110, 112, 114, 116, 118, 120, 122, and 124 respectively correspond to object symbols that may be included within the document 32. This grouping of object symbol tools 110, 112, 114, 116, 118, 120, 122, and 124 have a common object symbol type associated with each of them as all have a common carpentry type. In this regard, the legend 64 contains legend entries 72, 74, 76 and 78 that respectively correspond to the object symbol tools 116, 112, 110, and 122. The tool set 106 includes object symbol tools 126, 128, and 130 respectively correspond to object symbols that may be included within the document 32. This grouping of object symbol tools 126, 128, and 130 have a common object symbol type associated with each of them as all have a common flooring type. In this regard, the legend 64 contains legend entries 82 and 84 that respectively correspond to the object symbol tools 128 and 126. The tool set 108 includes object symbol tools 132, 134, 136, and 138 respectively correspond to object symbols that may be included within the document 32. This grouping of object symbol tools 132, 134, 136, and 138 have a common object symbol type associated with each of them as all have a common electrical type. It is understood that the groups of object symbols may be groups and regrouped as desired based upon one or more object symbol types.

Figure 10:
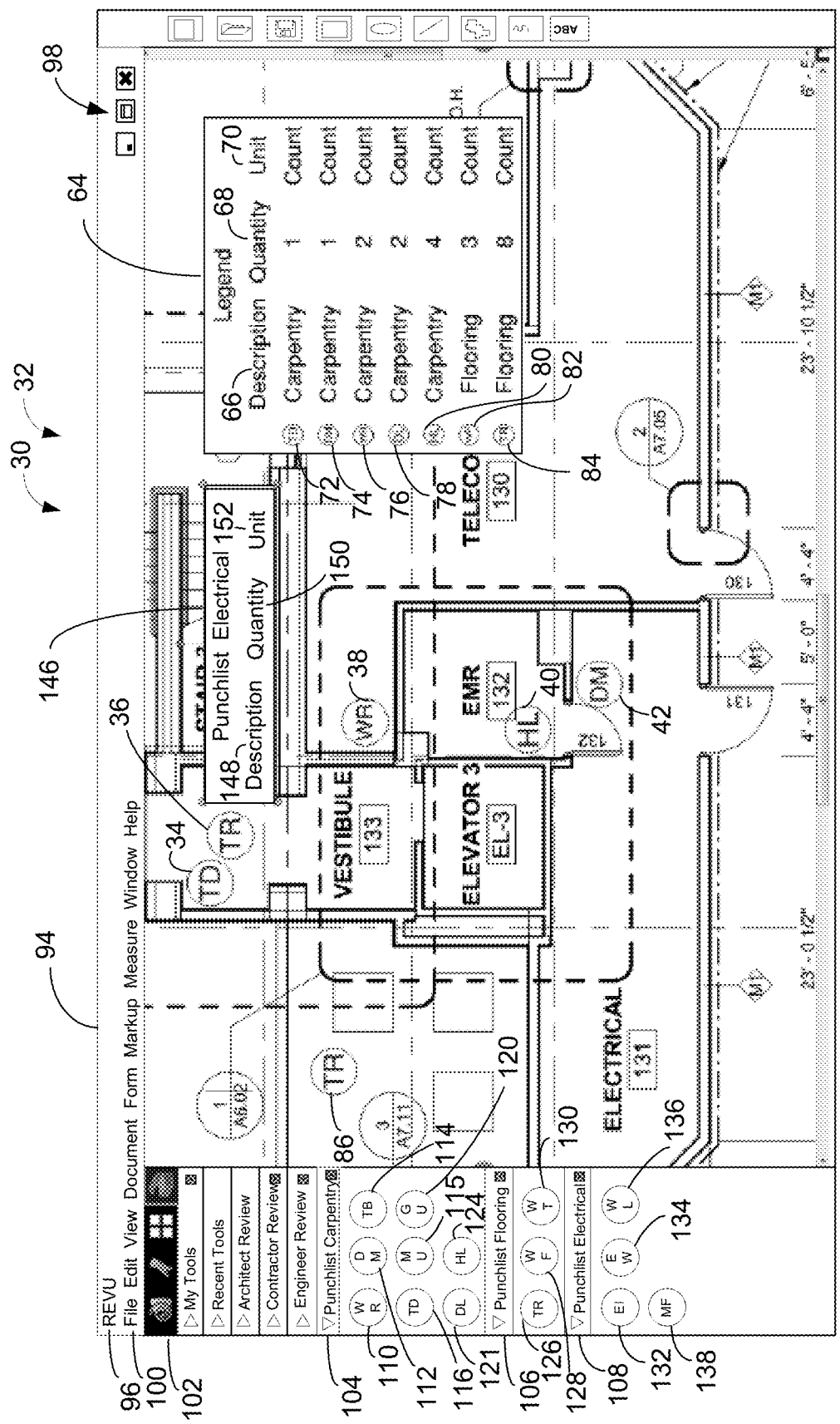
FIG. 10 is the exemplary graphical user interface of FIG. 9 with the addition of a new legend.

It is contemplated that the legend may be created and updated via use of pull-down menus. In this regard a sub-menu 140 may be provided from the tool set 108 and a legend tool menu item 142 allows for the selection of a "Create New Legend" sub-menu item 144. The selection of the "Create New Legend" sub-menu item 144 is contemplated to initiate the step 220 of generating one or more groups of object symbols of the one or more object symbols based upon the object symbol type of each of the object symbols. In this case, referring now to FIG. 10, a new legend 146 is created. FIG. 10 depicts the graphical user interface 30 and document 32 of FIG. 8 with the addition of the new legend 146. The new legend 146 features a title "Punchlist Electrical." The new legend 144 features a legend entry type header 148 denoted "Description," a legend entry type header 150 denoted "Quantity," and a legend entry type header 152 denoted "Unit." The new legend 146 does not contain any legend entries as no object symbols have been selected that correspond to any of the object symbol tools 132, 134, 136, and 138.

Figure 11:
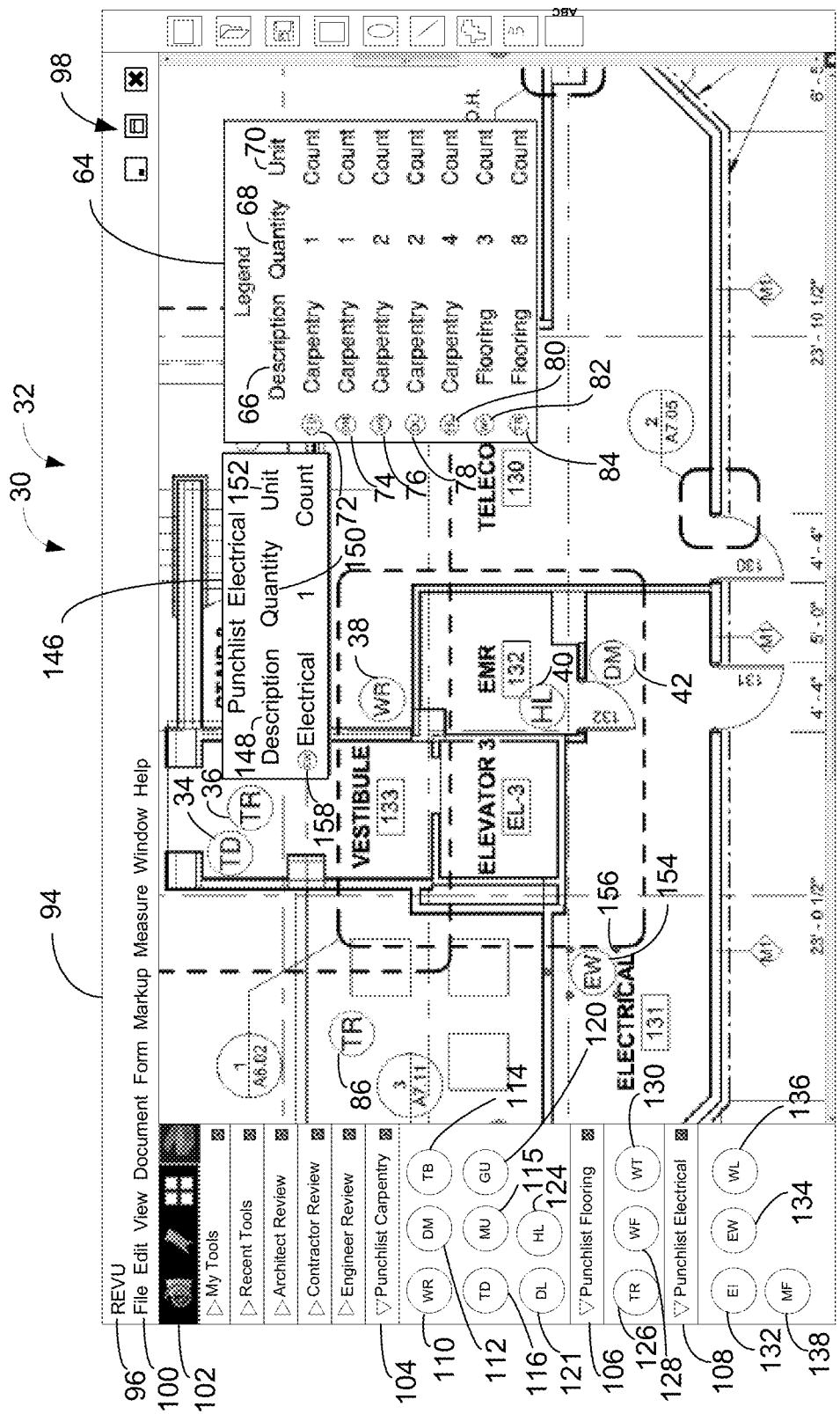
FIG. 11 is the exemplary graphical user interface of FIG. 10 with the addition of a new object symbol.

Referring now to FIG. 11 there is depicted the graphical user interface 30 of FIG. 10 with a new markup having been added, object symbol 154. The object symbol 154 is graphically represented by the letter "EW" within a circle. Object symbol 154 has been selected as indicated by selection highlight 156. As mentioned above, the method may further include the step 260 of receiving changes to the document 30, and the changes include changes to a number of the object symbols, such as the addition of the object symbol 154. A legend entry 158 is added to the new legend 146 that corresponds to the object symbol type of the newly added object symbol 154. As the object type numerical value of the newly added object symbol 86 is a single instance, the group cumulative quantity is calculated to be 1 as indicated.

Each object symbol may also have an object type status associated therewith. The system may determine groups of object symbols based upon the object symbol type status, and the may further determine a group cumulative quantity of such groups of object symbols based upon the object symbol type status. This information may be used to generate corresponding legend entries and regenerate and display the legend with such information.

Figure 12:
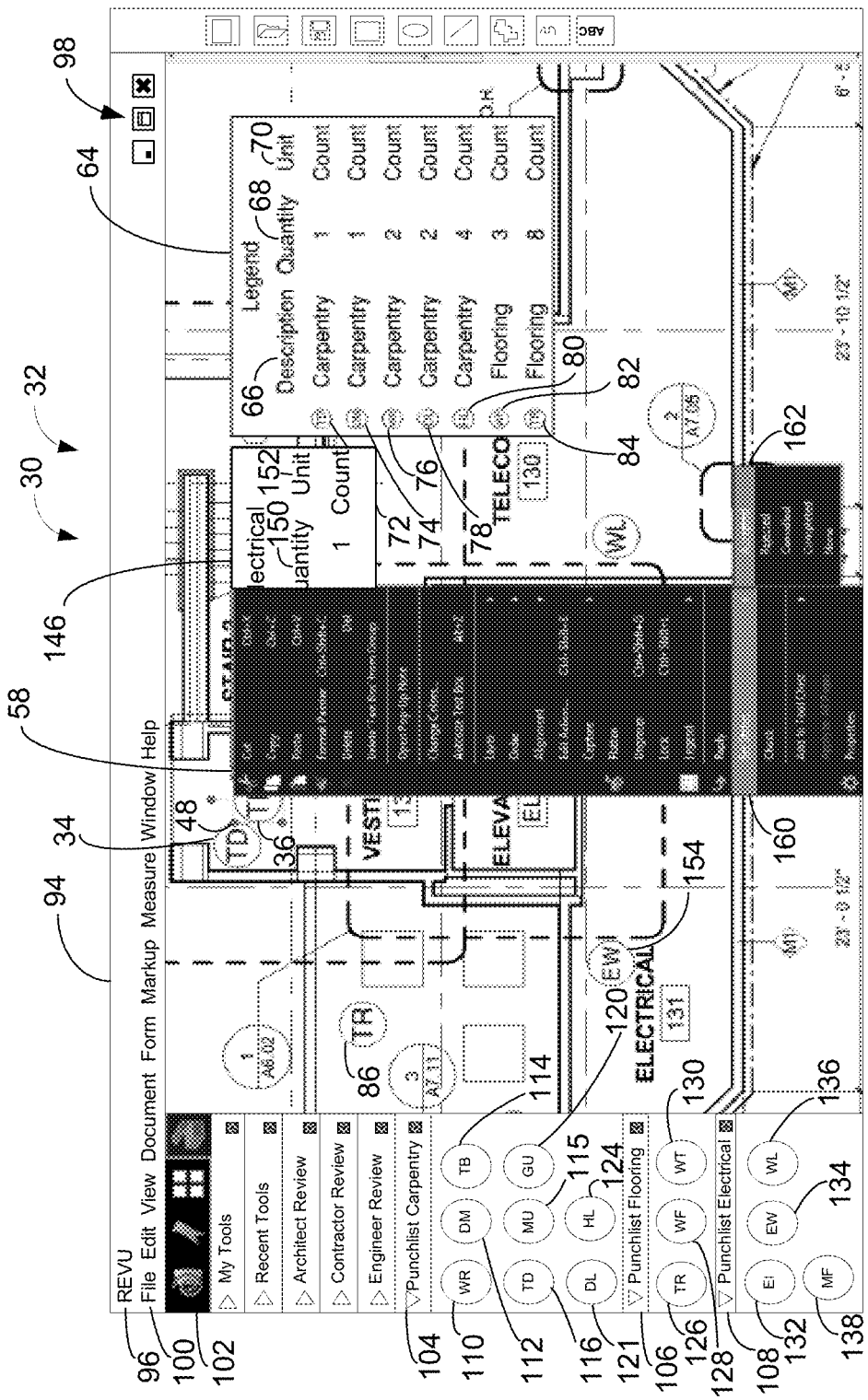
FIG. 12 is the exemplary graphical user interface of FIG. 11 with the addition of the tools menu.

Referring now to FIG. 12 there is depicted the graphical user interface 30 of FIG. 11 with the addition of the tools menu 58. In addition the object symbol 36 has been selected as indicated by the selection highlight 48. The tools menu 58 may be accessed and displayed by "right-clicking" of the mouse controls. Movement of a cursor adjacent a set status tool menu item 160 allows for the selection of an "Accepted" sub-menu item 162. The selection of the "Accepted" sub-menu item 162 is used to change the object symbol type status associated with the selected object symbol 36 from a default outstanding status to an accepted status.

Figure 13:
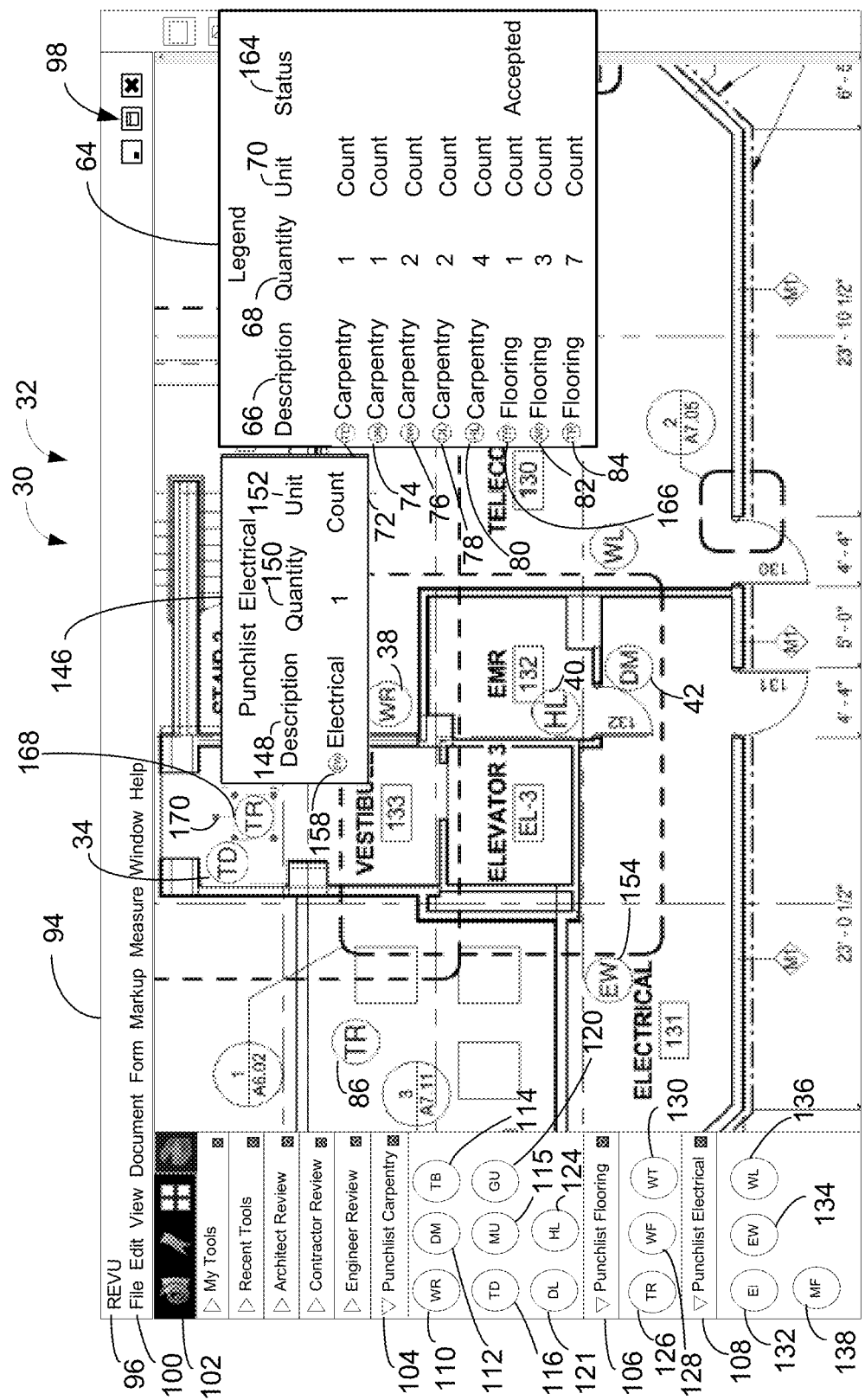
FIG. 13 is the exemplary graphical user interface of FIG. 12 with changes to the legend.

Referring now to FIG. 13 there is depicted the graphical user interface 30 of FIG. 12. As the object symbol status of object symbol 36 has been changed, the system may be configured to automatically change the object symbol 36 to object symbol 168. The object symbol 168 is selected as indicated by the selection highlight 170. The object symbol 36 is replaced by the object symbol 168 at the same location on the document 32. In effect the object symbol 36 is deleted. The attributes of object symbol 168 may have the same attributes as that of the object symbol 36 with the exception of the object symbol type status and graphical appearance. The graphical representation of object symbol 168 is different from that of the object symbol 36 and may appear in the different type of lining and/or color so as to aid the viewing user that there has been a change in object symbol type status.

As the object symbol 36 has effectively been deleted, the group cumulative quantity associated with the group of object symbols in which object symbol 36 is associated with is automatically incremented by the object type numerical value. In addition, the legend 64 may be updated as shown. The legend entry 84 is associated with the object type of the object symbol 36. As such, the legend entry 84 is now indicated as having a quantity of 7 as reduced by 1 from the previous value of 8. In addition, as the object symbol 168 has replaced the selected object symbol 36, the system is configured to add the object symbol 168 to be associated with the legend 64. As such, a new legend entry 166 is generated. The new legend entry 164 is grouped into its own group of object symbols having the same graphical representation, object symbol type, object type numerical value, and object symbol status. In this example, as there are no other object symbols in the document 32 within this same group, the new legend entry 166 indicates a quantity of 1.

Though not required the legend 64 features the addition of a legend entry type header 164 denoted "Status." It is contemplated that providing the user with status information in the context of a punchlist is especially useful information to be tabulated in the legend 64. The legend entry 166 includes the text description "Accepted" under the legend entry type header 164. It is noted that the other legend entries 72, 74, 76, 78, 80, 82 and 84 do not have any text description under the legend entry type header 164. This is because these entries and their corresponding object symbols have not had any change in their respective object symbol type status. Rather than just being blank, a default descriptor, such as "outstanding" or "unfinished" can also be provided.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of computerized presentation of a legend of object symbols on a design document, the method comprising:

receiving, at one or more computing devices, a design document having a plurality of object symbols, each object symbol of the plurality of object symbols comprising a graphical representation, and an object symbol type defining a trade;

generating, at the one or more computing devices, one or more groups of object symbols of the plurality of object symbols based upon the object symbol type of each of the object symbols, wherein the object symbols in each group are associated with the same object symbol type;

generating, at the one or more computing devices, a first legend including one or more first legend entries, wherein each first legend entry is associated with a corresponding group of the one or more groups of object symbols and includes i)a group type symbol indicative of a task and ii) a description of the trade defined by the object symbol type associated with the corresponding group;

generating, at the one or more computing devices, a second legend in response to receiving user selection of a first object symbol type, the second legend being separate from the first legend and the first object symbol type defining a trade;

generating, at the one or more computing devices, one or more second legend entries in the second legend in response to receiving user selection of one or more object symbols that are associated with the design document and correspond to the first object symbol type; and displaying, at the one or more computing devices, the first legend and the second legend on the design document.

2. The method of claim 1, wherein each object symbol of the plurality of object symbols comprises an object type numerical value, and further comprising:

deriving, at the one or more computing devices, a group cumulative quantity for each group of object symbols based upon the object type numerical value of each object symbol in each group of object symbols.

3. The method of claim 2, wherein the object type numerical value for a given object symbol corresponds to a measurement.

4. The method of claim 3, wherein the measurement is a linear distance.

5. The method of claim 3, wherein the measurement is an area.

6. The method of claim 2, wherein each first legend entry includes a unit of measurement corresponding to the group cumulative quantity.

7. The method of claim 2, further comprising:

receiving, at the one or more computing devices, changes to the design document, the changes include changes to a number of the object symbols;

revising, at the one or more computing devices, the group cumulative quantity for each group of object symbols that have been changed;

regenerating, at the one or more computing devices, the first legend; and redisplaying, at the one or more computing devices, the first legend on the design document.

8. The method of claim 1, wherein a selected one of the plurality of object symbols has more than one object type numerical value associated therewith.

9. The method of claim 1, wherein each group type symbol includes a graphical representation.

10. The method of claim 1, further comprising:
- receiving, at the one or more computing devices, a selection of object symbols of the plurality of object symbols, wherein the generating of the one or more groups of object symbols is based upon the selected object symbols.

11. The method of claim 1, wherein the design document includes multiple pages, further comprising:
- receiving, at the one or more computing devices, a page range of the multiple pages, wherein the generated one or more groups of object symbols are within the received page range.

* * * * *